United States Patent
Tabata

(10) Patent No.: US 9,592,712 B2
(45) Date of Patent: Mar. 14, 2017

(54) SUSPENSION APPARATUS

(71) Applicant: Masaaki Tabata, Nagoya (JP)

(72) Inventor: Masaaki Tabata, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 23 days.

(21) Appl. No.: 14/418,321

(22) PCT Filed: Oct. 16, 2013

(86) PCT No.: PCT/IB2013/002296
§ 371 (c)(1),
(2) Date: Jan. 29, 2015

(87) PCT Pub. No.: WO2014/064498
PCT Pub. Date: May 1, 2014

(65) Prior Publication Data
US 2015/0183288 A1 Jul. 2, 2015

(30) Foreign Application Priority Data

Oct. 23, 2012 (JP) ................................ 2012-234193

(51) Int. Cl.
*F16F 9/34* (2006.01)
*B60G 13/08* (2006.01)
(Continued)

(52) U.S. Cl.
CPC ............ *B60G 13/08* (2013.01); *B60G 13/04* (2013.01); *B60G 17/08* (2013.01); *F16F 7/09* (2013.01);
(Continued)

(58) Field of Classification Search
CPC .... F16F 7/09; F16F 9/36; B60G 13/04; B60G 13/08; B60G 17/08; B60G 2202/23;
(Continued)

(56) References Cited

U.S. PATENT DOCUMENTS 2,429,140 A * 10/1947 Snyder .................. B60G 13/04
188/129
2,928,507 A 3/1960 Thompson
(Continued)

FOREIGN PATENT DOCUMENTS

| EP | 0 465 887 A1 | 1/1992 |
|---|---|---|
| FR | 2164158 A5 | 7/1973 |
| GB | 1411611 A | 10/1975 |
| JP | 2004-036753 A | 2/2004 |
| JP | 2007-057058 A | 3/2007 |
| JP | 2009-127651 A | 6/2009 |
| KR | 1020100094002 A | 8/2010 |

OTHER PUBLICATIONS

International Search Report and Written Opinion for corresponding International Patent Application No. PCT/IB2013/002296 mailed Mar. 13, 2014.

*Primary Examiner* — Melody Burch
(74) *Attorney, Agent, or Firm* — Sughrue Mion, PLLC

(57) ABSTRACT

A suspension apparatus includes: a cylinder connected to one of a sprung member and an unsprung member, an interior space of the cylinder being partitioned into a piston upper chamber and a piston lower chamber; a piston connected to the other of the sprung member and the unsprung member; an expansion side friction member configured to damp a movement of the piston, a force of the expansion side friction member for damping the movement of a piston being increased by exerting a pressure of the piston upper chamber on the expansion side friction member; and a contraction side friction member configured to damp the movement of the piston, a force of the contraction side friction member for damping the movement of the piston being increased by exerting a pressure of the piston lower chamber on the contraction side friction member.

9 Claims, 8 Drawing Sheets

(51) Int. Cl.
*F16F 9/36* (2006.01)
*F16F 7/09* (2006.01)
*B60G 13/04* (2006.01)
*B60G 17/08* (2006.01)
*F16F 9/00* (2006.01)

(52) U.S. Cl.
CPC .............. *F16F 9/36* (2013.01); *B60G 2202/23* (2013.01); *B60G 2202/24* (2013.01); *B60G 2202/312* (2013.01); *B60G 2204/62* (2013.01); *B60G 2500/104* (2013.01)

(58) Field of Classification Search
CPC .......... B60G 2202/24; B60G 2202/312; B60G 2204/62; B60G 2500/104
See application file for complete search history.

(56) References Cited

U.S. PATENT DOCUMENTS

| 3,806,105 | A  | * | 4/1974  | Konishi  | B60R 19/32 188/129 |
| 3,866,724 | A  | * | 2/1975  | Hollnagel | F16F 7/09 188/129 |
| 4,979,595 | A  |   | 12/1990 | Paton    | |
| 6,357,612 | B1 | * | 3/2002  | Monaco   | B61G 9/08 188/315 |
| 7,413,062 | B2 | * | 8/2008  | Vandewal | B60G 17/0152 188/266.5 |

* cited by examiner

SUSPENSION APPARATUS

BACKGROUND OF THE INVENTION

1. Field of the Invention

The invention relates to a suspension apparatus.

2. Description of Related Art

A suspension apparatus is installed in a vehicle to secure passenger comfort during travel and secure a road surface tracking ability of a vehicle wheel. The suspension apparatus includes an elastic body, such as a spring, provided between a vehicle body and the vehicle wheel. When the elastic body elastically deforms, a relative positional relationship between the vehicle body and the vehicle wheel varies in accordance with a condition of a road surface on which the vehicle is traveling, and as a result, shock received on the vehicle body side from the road surface can be absorbed. The suspension apparatus is further provided with a damping mechanism that damps periodic vibration accompanying the elastic deformation of the elastic body. Furthermore, a technique for varying friction generated in the damping mechanism during damping of the periodic vibration of the elastic body in accordance with a travel condition of the vehicle has been developed recently to achieve a further improvement in passenger comfort during vehicle travel.

In the suspension apparatus described above, fine control of an actuator and so on are required to vary the friction generated in the damping mechanism during damping of the periodic vibration of the elastic body, and therefore a configuration of the suspension apparatus tends to increase in complexity. Hence, demand exists for a further improvement in passenger comfort during vehicle travel using a suspension apparatus having a simple configuration.

SUMMARY OF THE INVENTION

The invention provides a suspension apparatus having a simple configuration, with which a further improvement in passenger comfort can be achieved during vehicle travel.

An aspect of the invention is a suspension apparatus includes: a cylinder connected to one of a sprung member and an unsprung member, an interior space of the cylinder being partitioned into a piston upper chamber and a piston lower chamber; a piston connected to the other of the sprung member and the unsprung member; an expansion side friction member configured to damp a movement of the piston, a force of the expansion side friction member for damping the movement of a piston being increased by exerting a pressure of the piston upper chamber on the expansion side friction member; and a contraction side friction member configured to damp the movement of the piston, a force of the contraction side friction member for damping the movement of the piston being increased by exerting a pressure of the piston lower chamber on the contraction side friction member.

The force of the expansion side friction member for damping the movement of the piston, which is increased by exerting the pressure of the piston upper chamber on the expansion side friction member, may be larger than the force of the contraction side friction member for damping the movement of the piston, which is increased by exerting the pressure of the piston lower chamber on the contraction side friction member.

The expansion side friction member may have a tapered outer peripheral surface and the contraction side friction member has a tapered outer peripheral surface, and an angle formed by the outer peripheral surface of the expansion side friction member and an axial center of the piston may be smaller than an angle formed by the outer peripheral surface of the contraction side friction member and the axial center of the piston.

The piston may have a piston portion that reciprocates through the cylinder, and the piston portion may partition the interior space of the cylinder into the piston upper chamber on an upper side of the piston portion and the piston lower chamber on a lower side of the piston portion.

A working fluid that generates fluid resistance may be sealed in the cylinder. In this case, a pressure of the working oil in the expansion side pressure sensing chamber may be exerted on the expansion side friction member, and a pressure of the working oil supplied in the expansion side pressure sensing chamber may be exerted on the contraction side friction member.

The suspension apparatus may further include: an expansion side pressure sensing chamber; a contraction side pressure sensing chamber; an expansion side passage that connects the piston upper chamber and the expansion side pressure sensing chamber; and a contraction side passage that connects the piston lower chamber and the contraction side pressure sensing chamber. In this case, when the suspension apparatus expands, the working fluid in the piston upper chamber may be supplied into the expansion side pressure sensing chamber through the expansion side passage, and a pressure of the working oil supplied into the expansion side pressure sensing chamber may be exerted on the expansion side friction member. In addition, when the suspension apparatus contracts, the working fluid in the piston lower chamber may be supplied into the contraction side pressure sensing chamber through the contraction side passage, and a pressure of the working oil supplied into the expansion side pressure sensing chamber may be exerted on the contraction side friction member.

The suspension apparatus may further include: an expansion side pressure adjustment unit configured to adjust an amount of the working fluid in the piston upper chamber to be applied to the expansion side friction member; and a contraction side pressure adjustment unit configured to adjust an amount of working fluid in the piston lower chamber to be applied to the contraction side friction member.

The suspension apparatus may further include a control unit that controls the expansion side pressure adjustment unit and the contraction side pressure adjustment unit.

With the suspension apparatus according to the invention, which has a simple configuration including the expansion side friction member and the contraction side friction member, a further improvement in passenger comfort can be achieved during vehicle travel.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described in detail below on the basis of the drawings. Note that the invention is not limited to these embodiments. Further, constituent elements in the following embodiments include elements that could be substituted easily by a person skilled in the art or substantially identical, elements. In other words, various modifications, such as combining the constituent elements described in the embodiments and so on appropriately, may be implemented within a scope that does not depart from the spirit of the invention.

First Embodiment

Figure 1:
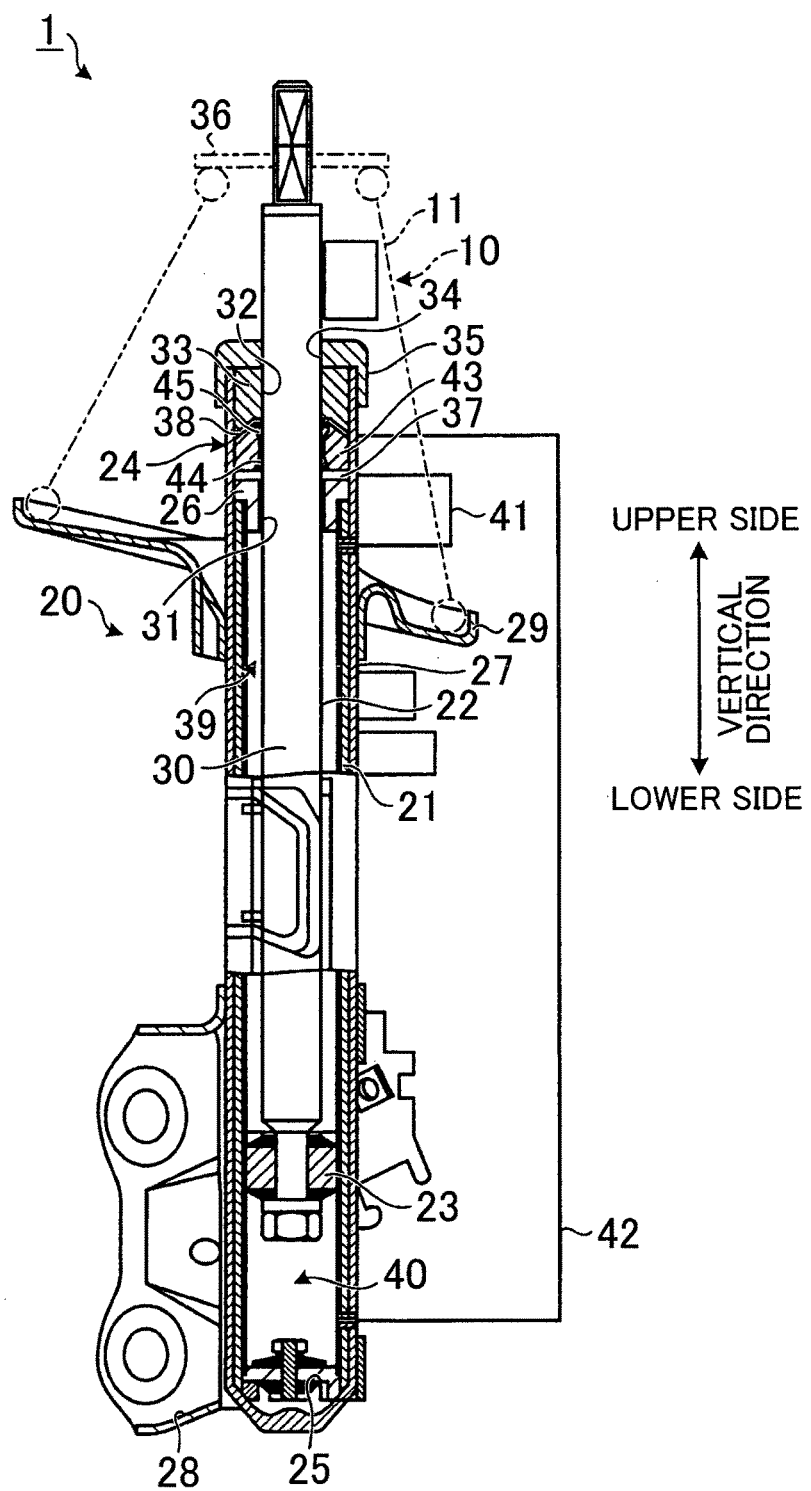
FIG. 1 is a longitudinal sectional view showing a schematic configuration of a suspension apparatus according to a first embodiment.
Figure 2:
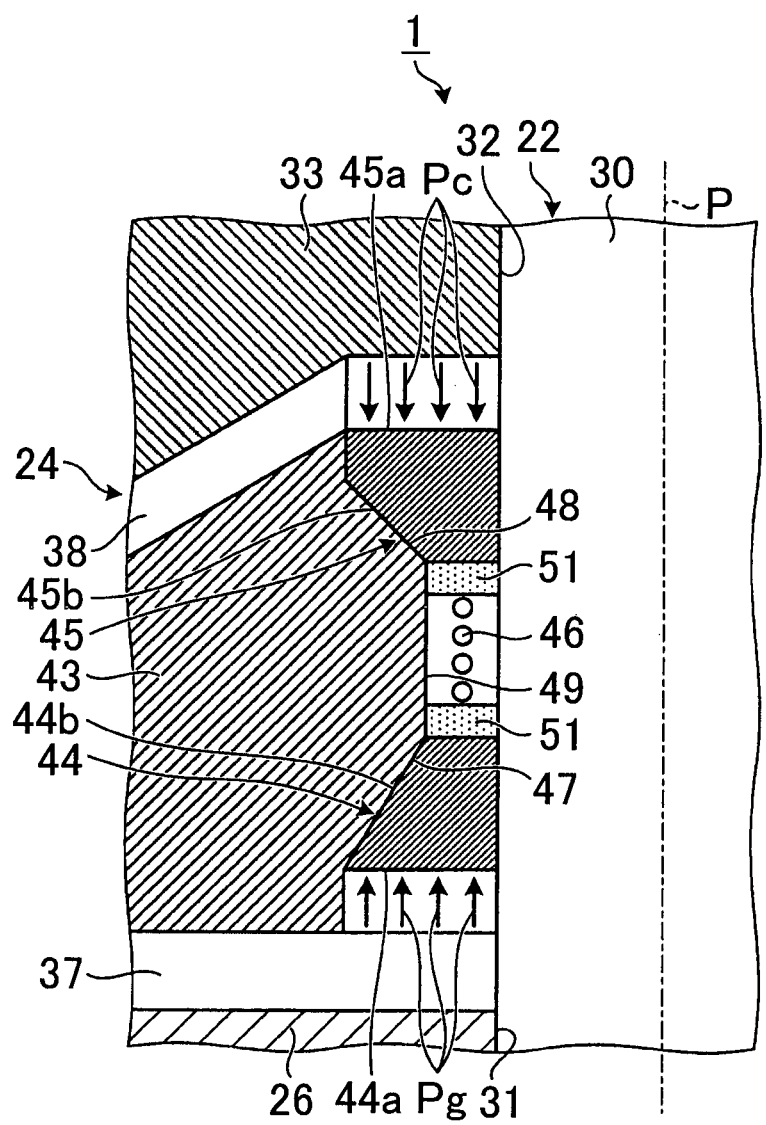
FIG. 2 is a longitudinal sectional view showing main parts of a damping mechanism of the suspension apparatus according to the first embodiment.
Figure 3:
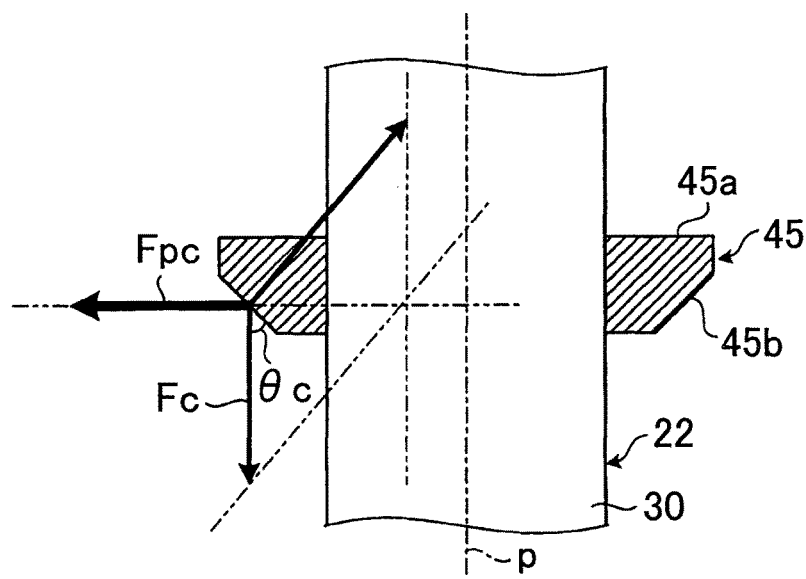
FIG. 3 is a longitudinal sectional view illustrating a force generated by a contraction side friction member provided in the damping mechanism of the suspension apparatus according to the first embodiment.
Figure 4:
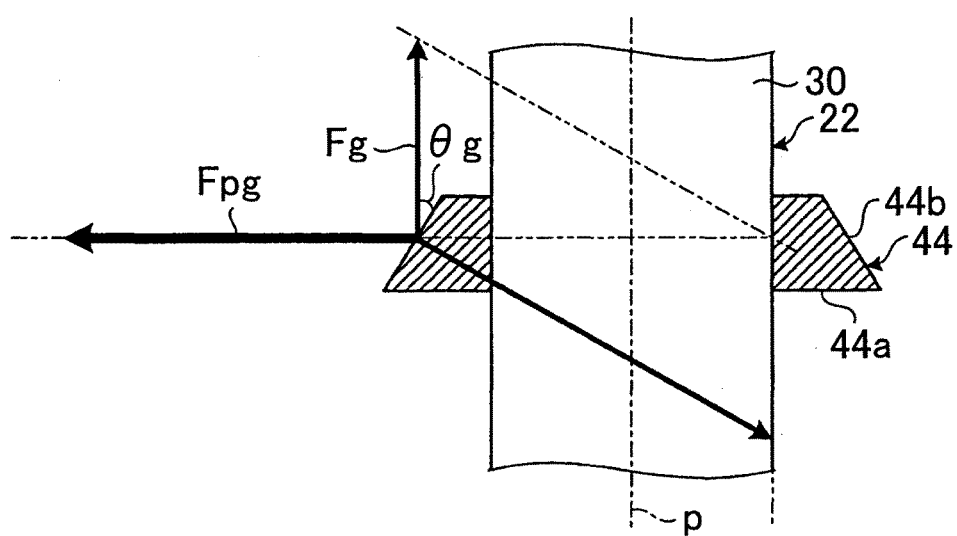
FIG. 4 is a longitudinal sectional view illustrating a force generated by an expansion side friction member provided in the damping mechanism of the suspension apparatus according to the first embodiment.

A suspension apparatus according to a first embodiment of the invention will now be described on the basis of FIGS. 1 to 4. FIG. 1 is a longitudinal sectional view showing a schematic configuration of the suspension apparatus according to the first embodiment. FIG. 2 is a longitudinal sectional view showing main parts of a damping mechanism of the suspension apparatus according to the first embodiment. FIG. 3 is a longitudinal sectional view illustrating a force generated by a contraction side friction member provided in the damping mechanism of the suspension apparatus according to the first embodiment. FIG. 4 is a longitudinal sectional view illustrating a force generated by an expansion side friction member provided in the damping mechanism of the suspension apparatus according to the first embodiment.

A suspension apparatus 1 according to the first embodiment shown in FIG. 1 is provided to form a pair with each vehicle wheel of a vehicle, and supports the corresponding vehicle wheel on a vehicle body of the vehicle. The suspension apparatus 1 is provided between a sprung member, not shown in the drawings, and an unsprung member, not shown in the drawings, of the vehicle so as to connect the sprung member to the unsprung member. The sprung member denotes a member supported by the suspension apparatus 1, and includes the vehicle body. The unsprung member denotes a member disposed closer to the vehicle wheel than the suspension apparatus 1, and includes a knuckle connected to the vehicle wheel, a lower arm connected to the knuckle, and so on.

As shown in FIG. 1, the suspension apparatus 1 includes a spring mechanism 10 and a damping mechanism 20. The spring mechanism 10 and the damping mechanism 20 are provided in parallel.

The spring mechanism 10 connects the sprung member to the unsprung member, generates a spring force corresponding to a relative displacement between the sprung member and the unsprung member, and applies the generated spring force to the sprung member and the unsprung member. For example, the spring mechanism 10 generates the spring force using a coil spring 11 (indicated by a dot-dot-dash line in FIG. 1) or the like attached to a piston 22 or the like of the damping mechanism 20, to be described below. The relative displacement between the sprung member and the unsprung member is relative displacement in a direction for causing the sprung member and the unsprung member to approach or separate from each other in an expansion/contraction direction of the suspension apparatus 1. Note that here, the expansion/contraction direction is illustrated as a direction corresponding to a vertical direction, but the expansion/contraction direction may have a predetermined incline relative to the vertical direction. Further, the spring mechanism 10 may be configured such that a spring modulus, or in other words the spring force, thereof can be controlled variably.

The damping mechanism 20 connects the sprung member to the unsprung member, and generates a damping force for damping relative movement between the sprung member and the unsprung member. The relative movement between the sprung member and the unsprung member is relative movement in the direction for causing the sprung member and the unsprung member to approach or separate from each other in the expansion/contraction direction. The damping mechanism 20 damps the relative movement by generating a damping force that corresponds to a relative velocity at which the sprung member and the unsprung member move relative to each other.

As shown in FIG. 1, the damping mechanism 20 includes a cylinder 21 connected to one of the sprung member and the unsprung member, in which a working oil (a working fluid) that generates fluid resistance due to its viscosity is sealed, a piston 22 that is connected to the other of the sprung member and the unsprung member and has a piston portion 23 that reciprocates through the cylinder 21, and a damping force application unit 24 that generates a force for damping movement of the piston 22 when the cylinder 21 and the piston 22 move relatively in the expansion/contraction direction.

The cylinder 21 is formed in the shape of a cylinder that is open at both ends, and the aforesaid working oil is sealed therein. A lower opening of the cylinder 21 is closed by a closing member 25, and an upper opening of the cylinder 21 is closed by a sealing member 26. An inner side of the cylinder. 21 is sealed from an outer side by the closing member 25 and the sealing member 26 such that an interior of the cylinder 21 is tightly sealed. Further, the entire cylinder 21 apart from the upper opening is covered in a shell 27. A bracket 28 attached to the unsprung member is provided in a lower end portion of the shell 27. In the first embodiment, the cylinder 21 is connected to the unsprung member via the shell 27. Further, a lower spring seat 29 is provided in an upper end portion of the shell 27, and the coil spring 11 is disposed on a front surface of the lower spring seat 29.

The piston 22 includes the piston portion 23 housed in the cylinder 21, and a piston rod 30 that extends upward from the piston portion 23. The piston portion 23 is provided to be capable of relative movement within the cylinder 21. The piston portion 23 partitions an interior space of the cylinder 21 into a piston upper chamber 39 on an upper side of the piston portion 23 and a piston lower chamber 40 on a lower side of the piston portion 23. The piston portion 23 is also provided with a port (not shown) through, which the working oil passes, and a valve (not shown) for opening and closing the port. The piston portion 23 moves through the cylinder 21 while receiving fluid resistance from the working oil, generated by the port and the valve. The piston rod 30 extends upward from the piston portion 23 so as to pass through the piston upper chamber 39. An upper end portion of the piston rod 30 of the piston 22 projects to the exterior of the cylinder 21.

Further, a hole 31 through which the piston rod 30 passes is formed in the sealing member 26 closing the upper opening of the cylinder 21. The piston rod 30 is passed through the hole 31 in the sealing member 26 so as to project to the exterior of the cylinder 21. Furthermore, the piston rod 30 is passed through the hole 31 in the sealing member 26 to be capable of moving in a longitudinal direction. The sealing member 26 thus tightly seals the interior of the cylinder 21 so as to suppress leakage of the working oil between an inner surface of the hole 31 and the piston rod 30.

Further, a shell side sealing member 33 provided with a hole 32 through which the piston rod 30 passes is provided in the upper end portion of the shell 27. The piston rod 30 is passed through the hole 32 in the shell side sealing member 33 so as to project to the exterior of the shell 27. The piston rod 30 is passed through the hole 32 in the shell side sealing member 33 to be capable of moving in the longitudinal direction. The shell side sealing member 33 thus tightly seals the interior of the shell 27 so as to suppress leakage of the working oil between an inner surface of the hole 32 and the piston rod 30. Furthermore, in the first embodiment, a shell side closing member 35 provided with a hole 34 through which the piston 30 passes is attached to an upper opening of the shell 27.

Further, in the first embodiment, an upper spring seat 36 (indicated by a dot-dot-dash line in FIG. 1) is provided in an upper end portion of the piston rod 30 so as to be attached to the sprung member and such that the coil spring 11 is disposed between the upper spring seat 36 and the lower spring seat 29. In the first embodiment, the piston 22 is connected to the sprung member via the upper spring seat 36. Furthermore, the coil spring 11 disposed between the upper spring seat 36 and the lower spring seat 29 exerts a biasing force on the upper spring seat 36 and the lower spring seat 29 in a direction for separating the seats 29, 36 from each other. In other words, the coil spring 11 applies a biasing force in a direction for causing the suspension apparatus 1 to expand by exerting a biasing force in a direction for causing the piston 22 to project from the cylinder 21 on the seats 29, 36.

The damping force application unit 24 is housed in the shell 27 and provided between the sealing members 26, 33. Further, the damping force application unit 24 is disposed at a remove from both of the sealing members 26, 33 so as to partition a space between the sealing members 26, 33 into an expansion side pressure sensing chamber 37 on a lower side and a contraction side pressure sensing chamber 38 on an upper side. The expansion side pressure sensing chamber 37 is connected to the piston upper chamber 39 by an expansion side passage 41 such that the working oil in the piston upper chamber 39 is supplied thereto. The contraction side pressure sensing chamber 38 is connected to the piston lower chamber 40 by a contraction side passage 42 such that the working oil in the piston lower chamber 40 is supplied thereto.

As shown in FIG. 2, the damping force application unit 24 includes a support member 43, an expansion side friction member 44, a contraction side friction member 45, and a coil spring 46 provided between the friction members 44, 45.

The support member 43 is formed in the shape of a cylinder having an inner diameter that is larger than an outer diameter of the piston rod 30 of the piston 22 and an outer diameter that is equal to an inner diameter of the shell 27. The support member 43 is disposed inside the shell 27 with the piston rod 30 passing through an inner side of the support member 43. The support member 43 prevents the working oil from flowing between the support member 43 and the inner surface of the shell 27. Further, an outer peripheral surface 44b of the expansion side friction member 44 and an outer peripheral surface 45b of the contraction side friction member 45 have a tapered shape, and a tapered expansion side contact surface 47 with which the outer peripheral surface 44b of the expansion side friction member 44 is in close contact, a tapered contraction side contact surface 48 with which the outer peripheral surface 45b of the contraction side friction member 45 is in close contact, and a connecting surface 49 that connects the expansion side contact surface 47 to the contraction side contact surface 48 are provided on an inner periphery of the support member 43. On the expansion side contact surface 47, the inner diameter of the support member 43 gradually decreases upward, and on the contraction side contact surface 48, the inner diameter of the support member 43 gradually increases upward. On the connecting surface 49, the inner diameter of the support member 43 remains constant in an axial center P direction.

The expansion side friction member 44 and the contraction side friction member 45 are both solid members made of an elastic material such as rubber, and are formed in a circular ring shape having a substantially identical inner diameter to the outer diameter of the piston rod 30. The expansion side friction member 44 and the contraction side friction member 45 are housed in the support member 43 such that the piston rod 30 passes through inner sides of the expansion side friction member 44 and the contraction side friction member 45. The expansion side friction member 44 faces the expansion side pressure sensing chamber 37. The expansion side friction member 44 has a large diameter surface 44a, facing the expansion side pressure sensing chamber 37, on which a pressure Pg (shown in FIG. 2) of the working oil in the piston upper chamber 39, which is supplied through the expansion side passage 41, acts. By exerting the pressure Pg of the working oil in the piston upper chamber 39 on the expansion side friction member 44, a force of the expansion side friction member 44 for damping the movement of the piston rod 30 of the piston 22 is increased. Further, the outer peripheral surface 44b of the expansion side friction member 44 is formed in a tapered shape so as to contact the expansion side contact surface 47 closely.

The contraction side friction member 45 faces the contraction side pressure sensing chamber 38. The contraction side friction member 45 has a large diameter surface 45a, facing the contraction side pressure sensing chamber 38, on which a pressure Pc (shown in FIG. 2) of the working oil in the piston lower chamber 40, which is supplied through the contraction side passage 42, acts. By exerting the pressure Pc of the working oil in the piston lower chamber 40 on the contraction side friction member 45, a force of the contraction side friction member 45 for damping the movement of the piston rod 30 of the piston 22 is increased. Further, the outer peripheral surface 45b of the contraction side friction member 45 is formed in a tapered shape so as to contact the contraction side contact surface 48 closely.

Furthermore, an angle $\theta g$ (shown in FIG. 4) formed by the tapered outer peripheral surface 44b of the expansion side friction member 44 and the axial center P of the piston rod 30 of the piston 22 is smaller than an angle $\theta c$ (shown in FIG. 3) formed by the tapered outer peripheral surface 45b of the contraction side friction member 45 and the axial center P of the piston rod 30 of the piston 22.

The coil spring 46 disposed between the expansion side friction member 44 and the contraction side friction member 45 is housed in the support member 43 such that the piston rod 30 passes through an inner side of the coil spring 46. The coil spring 46 biases the expansion side friction member 44 and the contraction side friction member 45 in a direction for separating from each other. Note that in the first embodiment, support members 51 are provided between the coil spring 46 and the respective friction members 44, 45 to prevent the coil spring 46 from digging into the friction members 44, 45.

Next, actions of the suspension apparatus 1 according to the first embodiment will be described. During vehicle travel, the suspension apparatus 1 is operated in accordance with a travel condition of the vehicle and a road surface condition. For example, when the vehicle travels over a projection on the road surface, an upward force is exerted on the vehicle wheel from the projection. The upward force exerted on the vehicle wheel is input into the shell 27 via the knuckle and so on. The shell 27 is biased downward from the coil spring 11 via the lower spring seat 29, and therefore a part of the upward force input into the shell 27 is canceled out by the biasing force of the coil spring 11, while the remainder causes the coil spring 11 to contract. In accordance with the contraction of the coil spring 11, the shell 27 and the cylinder 21 to which the shell 27 is attached move upward, leading to a reduction in an overall length of the suspension apparatus 1. At this time, the piston 22 moves downward through the cylinder 21.

When the vehicle wheel passes the projection on the road surface, the upward force exerted on the vehicle wheel from the road surface is canceled, and therefore the force for causing the coil spring 11 to contract is also canceled. Accordingly, the contracted coil spring 11 expands such that the cylinder 21 and the shell 27 move downward relative to the piston 22. The overall length of the suspension apparatus 1 increases by an amount corresponding to the expansion of the coil spring 11. Hence, in the suspension apparatus 1, when the vehicle wheel travels over a projection on the road surface or the like, the coil spring 11 expands and contracts such that vibration is suppressed.

Further, when the coil spring 11 of the suspension apparatus 1 expands and contracts, the piston 22 moves through the cylinder 21. The working oil is sealed in the cylinder 21, and therefore the piston 22 moves through the cylinder 21 while receiving fluid resistance from the working oil. Hence, a movement speed of the piston 22 through the cylinder 21 is lower than that of a case where working oil is not sealed in the cylinder 21.

Furthermore, when the suspension apparatus 1 contracts, the piston moves downward through the cylinder 21 such that the working oil in the piston lower chamber 40 is supplied into the contraction side pressure sensing chamber 38 through the contraction side passage 42. The pressure Pc from the working oil supplied into the contraction side pressure sensing chamber 38 acts on the large diameter surface 45a of the contraction side friction member 45. Since the outer peripheral surface 45b of the contraction side friction member 45 is in close contact with the contraction side contact surface 48 of the support member 43, a total force Fc (indicated by an arrow in FIG. 3) of the pressure Pc acts on the contraction side contact surface 48. The contraction side contact surface 48 and the outer peripheral surface 45b of the contraction side friction member 45 are inclined by the angle $\theta c$ relative to the axial center P of the piston rod 30. Therefore, a force Fpc (indicated by an arrow in FIG. 3) by which the contraction side friction member 45 is pressed against the support member 43 is exerted on the contraction side contact surface 48 in an orthogonal direction to the axial center P of the piston rod 30 in accordance with the force Fc. The force Fpc is a force by which the contraction side friction member 45 is pressed against the piston rod 30 in the orthogonal direction to the axial center P of the piston rod 30, and therefore serves as the force for damping the movement of the piston rod 30 of the piston 22.

Hence, by applying the pressure Pc of the working oil in the piston lower chamber 40 to the contraction side friction member 45 when the suspension apparatus 1 contracts, the force Fpc by which the contraction side friction member 45 is pressed against the piston rod 30 of the piston 22 is exerted thereon. The force Fpc increases as the pressure of the working oil in the piston lower chamber 40 increases, and decreases as the pressure of the working oil in the piston lower chamber 40 decreases. Therefore, when the force Fpc by which the contraction side friction member 45 is pressed against the piston 22 is exerted on the contraction side friction member 45 in response to the movement of the piston 22 through the cylinder 21, the contraction side friction member 45 damps the movement of the piston 22 through the cylinder 21 together with the fluid resistance of the working oil that acts on the piston 22 as the piston 22 moves through the cylinder 21. Note that when the force Fpc by which the contraction side friction member 45 is pressed against the piston 22 increases, the force by which the contraction side friction member 45 damps the movement of the piston 22 increases, and when the force Fpc by which the contraction side friction member 45 is pressed against the piston 22 decreases, the force by which the contraction side friction member 45 damps the movement of the piston 22 decreases.

Further, when the suspension apparatus 1 expands, the piston 22 moves upward through the cylinder 21 such that the working oil in the piston upper chamber 39 is supplied into the expansion side pressure sensing chamber 37 through the expansion side passage 41. The pressure Pg from the working oil supplied into the expansion side pressure sensing chamber 37 acts on the large diameter surface 44a of the expansion side friction member 44. Since the outer peripheral surface 44b of the expansion side friction member 44 is in close contact with the expansion side contact surface 47 of the support member 43, a total force Fg (indicated by an arrow in FIG. 4) of the pressure Pc acts on the expansion side contact surface 47. The expansion side contact surface 47 and the outer peripheral surface 44b of the expansion side friction member 44 are inclined by the angle θg relative to the axial center P of the piston rod 30. Therefore, a force Fpg (indicated by an arrow in FIG. 4) by which the expansion side friction member 44 is pressed against the support member 43 is applied to the expansion side contact surface 47 in an orthogonal direction to the axial center P of the piston rod 30 in accordance with the force Fg. The force Fpg is a force by which the expansion side friction member 44 is pressed against the piston rod 30 in the orthogonal direction to the axial center P of the piston rod 30, and therefore serves as the force for damping the movement of the piston rod 30 of the piston 22.

Hence, by applying the pressure of the working oil in the piston upper chamber 39 to the expansion side friction member 44 when the suspension apparatus 1 expands, the force Fpg by which the expansion side friction member 44 is pressed against the piston rod 30 of the piston 22 is exerted thereon. The force Fpg increases as the pressure of the working oil in the piston upper chamber 39 increases, and decreases as the pressure of the working oil in the piston upper chamber 39 decreases. Therefore, when the force Fpg by which the expansion side friction member 44 is pressed against the piston 22 is exerted on the expansion side friction member 44 in response to the movement of the piston 22 through the cylinder 21, the expansion side friction member 44 damps the movement of the piston 22 through the cylinder 21 together with the fluid resistance of the working oil that acts on the piston 22 as the piston 22 moves through the cylinder 21. Note that when the force Fpg by which the expansion side friction member 44 is pressed against the piston 22 increases, the force by which the expansion side friction member 44 damps the movement of the piston 22 increases, and when the force Fpg by which the expansion side friction member 44 is pressed against the piston 22 decreases, the force by which the expansion side friction member 44 damps the movement of the piston 22 decreases.

Furthermore, the piston rod 30 of the piston 22 passes through the piston upper chamber 39, and therefore the fluid resistance of the working oil received by the piston 22 while moving upward through the cylinder 21 is larger than the fluid resistance of the working oil received by the piston 22 while moving downward through the cylinder 21. Therefore, when a distance by which the piston 22 moves upward through the cylinder 21 is equal to a distance by which the piston 22 moves downward through the cylinder 21, the pressure Pg of the working oil that acts on the expansion side friction member 44 as the piston 22 moves upward is larger than the pressure Pc of the working oil that acts on the contraction side friction member 45 as the piston 22 moves downward. Accordingly, the force Fpg acting on the expansion side friction member 44 is larger than the force Fpc acting on the contraction side friction member 45.

Further, the angle θg formed by the tapered peripheral surface 44b of the expansion side friction member 44 and the axial center P is smaller than the angle θc formed by the tapered outer peripheral surface 45b of the contraction side friction member 45 and the axial center P. Therefore, when the pressure Pg of the working oil that acts on the expansion side friction member 44 as the piston rod 30 moves upward through the cylinder 21 is equal to the pressure Pc of the working oil that acts on the contraction side friction member 45 as the piston rod 30 moves downward through the cylinder 21, the force Fpg acting on the expansion side friction member 44 is larger than the force Fpc acting on the contraction side friction member 45.

In the suspension apparatus 1 according to the first embodiment, the piston rod 30 of the piston 22 passes through the piston upper chamber 39, and therefore a damping force generated by the piston upper chamber 39 as the piston 22 moves upward through the cylinder 21 exceeds a damping force generated by the piston lower chamber 40 as the piston 22 moves downward through the cylinder 21. Hence, in the suspension apparatus 1, the pressure Pg of the working oil applied to the expansion side friction member 44 from the piston upper chamber 39 is larger than the pressure Pc of the working oil applied to the contraction side friction member 45 from the piston lower chamber 40. Accordingly, in the suspension apparatus 1, the force Fpg by which the expansion side friction member 44 is pressed against the piston 22 is larger than the force Fpc by which the contraction side friction member 45 is pressed against the piston 22.

Hence, the suspension apparatus 1 has a simple configuration including the expansion side friction member 44 and the contraction side friction member 45, and therefore the suspension apparatus 1 can contract easily. Even when high frequency vibration is applied to the vehicle from the road surface on which the vehicle is traveling, the suspension apparatus 1 can contract easily, and as a result, the high frequency vibration acting on the vehicle from the road surface on which the vehicle is traveling can be reduced.

Further, since the suspension apparatus 1 has a simple configuration including the expansion side friction member 44 and the contraction side friction member 45, the suspension apparatus 1 is less likely to expand. Therefore, when the vehicle body of the vehicle attempts to roll at the start of a steering operation during travel, the suspension apparatus 1 is less likely to expand, and as a result, rolling of the vehicle body of the vehicle at the start of a steering operation during travel can be reduced.

Hence, by providing the suspension apparatus 1 with a simple configuration including the expansion side friction member 44 and the contraction side friction member 45, a further improvement in passenger comfort during vehicle travel can be achieved.

Furthermore, in the suspension apparatus 1, the angle θg formed by the tapered outer peripheral surface 44b of the expansion side friction member 44 and the axial center P of the piston rod 30 of the piston 22 is smaller than the angle θc formed by the tapered outer peripheral surface 45b of the contraction side friction member 45 and the axial center P of the piston rod 30 of the piston 22. Therefore, in the suspension apparatus 1, the force Fpg by which the expansion side friction member 44 is pressed against the piston 22 can reliably be made larger than the force Fpc by which the contraction side friction member 45 is pressed against the piston 22. Hence, with the suspension apparatus 1, a further improvement in passenger comfort during vehicle travel can be achieved reliably with a simple configuration.

Moreover, in the suspension apparatus 1 according to the first embodiment, the force for causing the friction members 44, 45 to damp the movement of the piston 22 is increased by supplying the working oil in the piston upper chamber 39 to, the expansion side pressure sensing chamber 37 and supplying the working oil in the piston lower chamber 40 to the contraction side pressure sensing chamber 38. Hence, the suspension apparatus 1 has a simple configuration in which the piston upper chamber 39 and the expansion side pressure sensing chamber 37 are connected by the expansion side passage 41 and the piston lower chamber 40 and the contraction side pressure sensing chamber 38 are connected by the contraction side passage 42. With this simple configuration, the force for causing the friction members 44, 45 of the suspension apparatus 1 to damp the movement of the piston 22 can be increased more reliably, and as a result, a further improvement in passenger comfort during vehicle travel can be achieved even more reliably.

Second Embodiment

Figure 5:
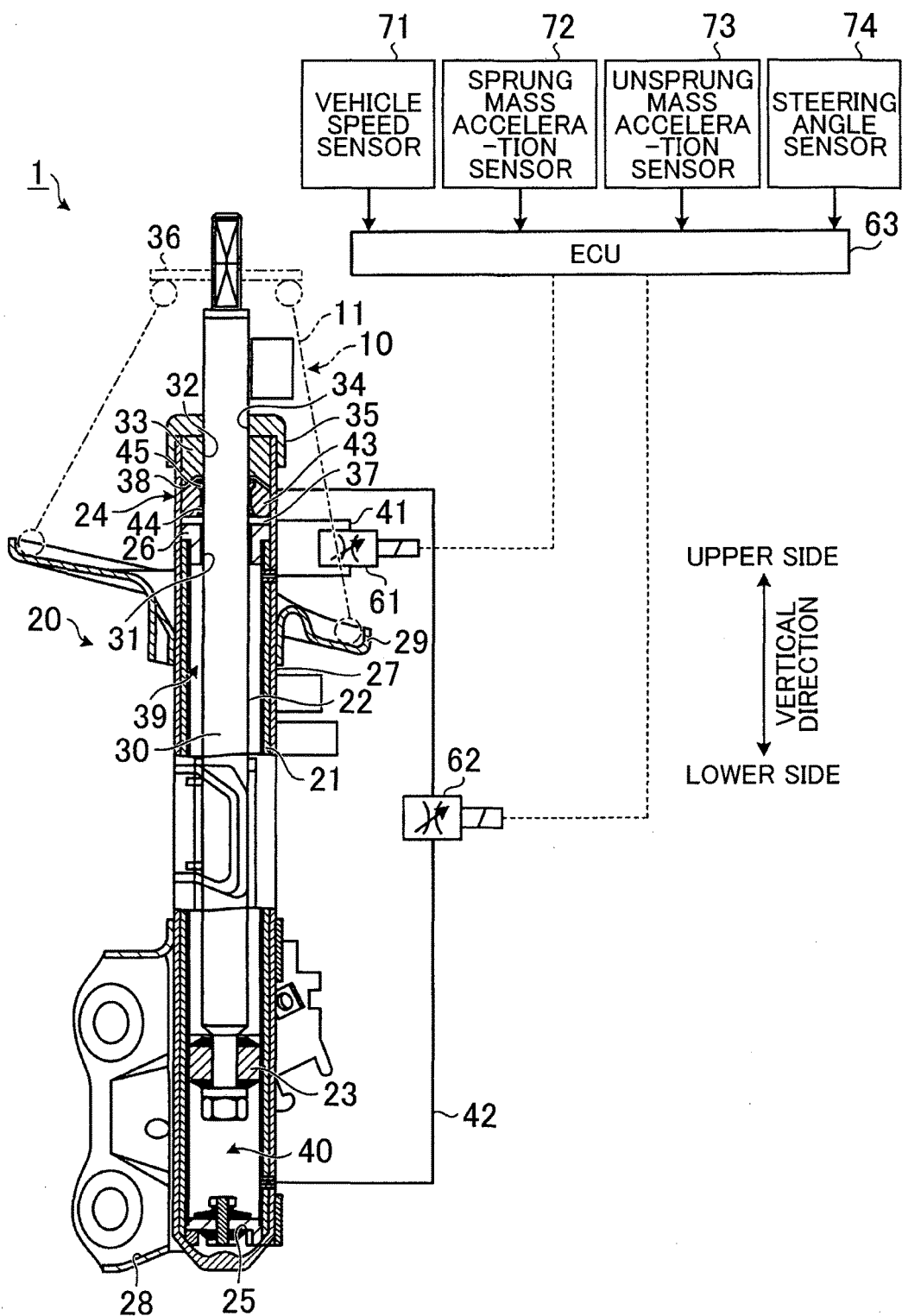
FIG. 5 is a view, showing a schematic configuration of a suspension apparatus according to a second embodiment.
Figure 6A:
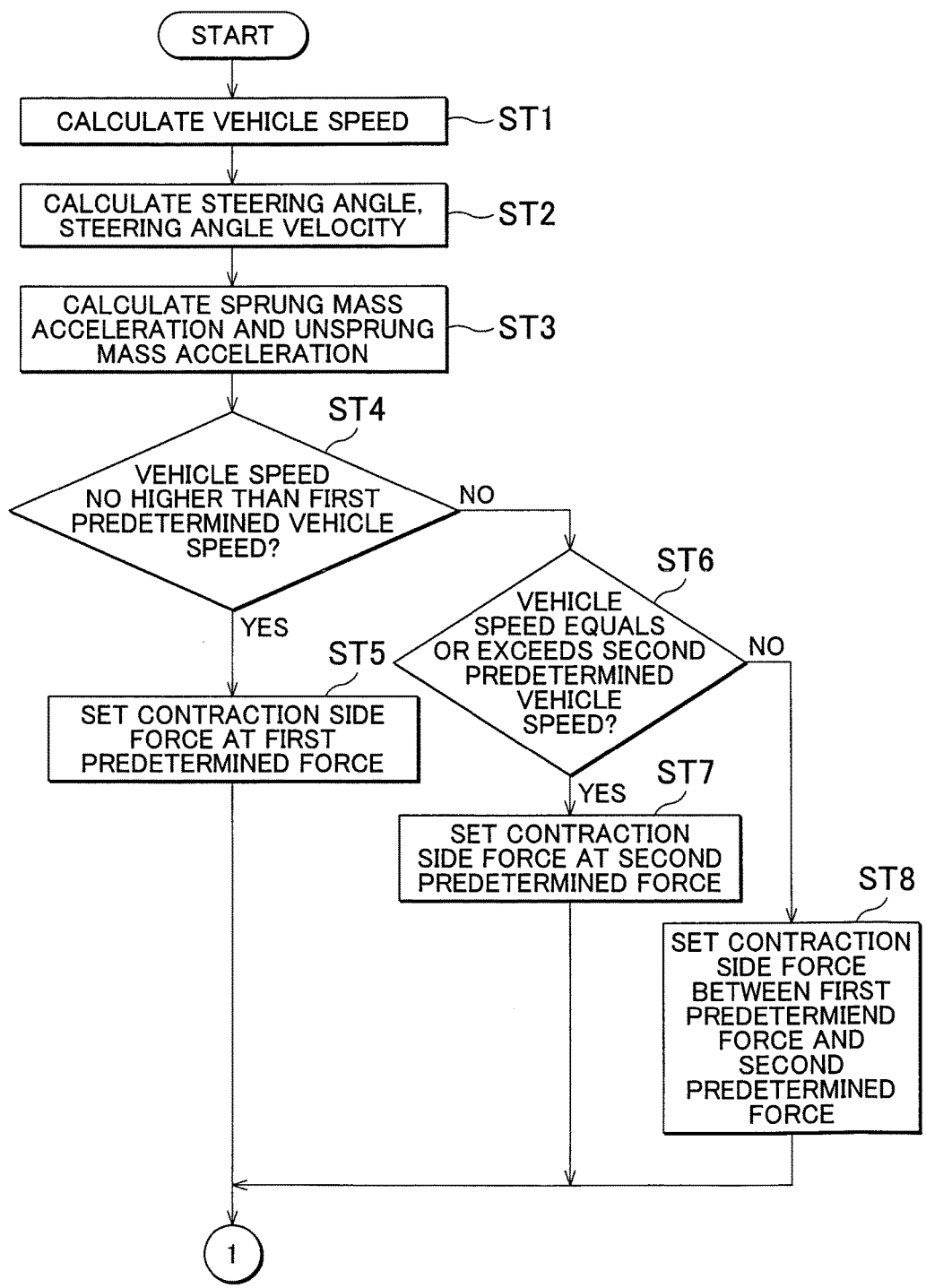
FIG. 6 is an example of a flowchart illustrating control of a pressure of a working oil supplied to an expansion side pressure sensing chamber and a contraction side pressure sensing chamber, which is executed by an electronic control unit (ECU) of the suspension apparatus according to the second embodiment.
Figure 6B:
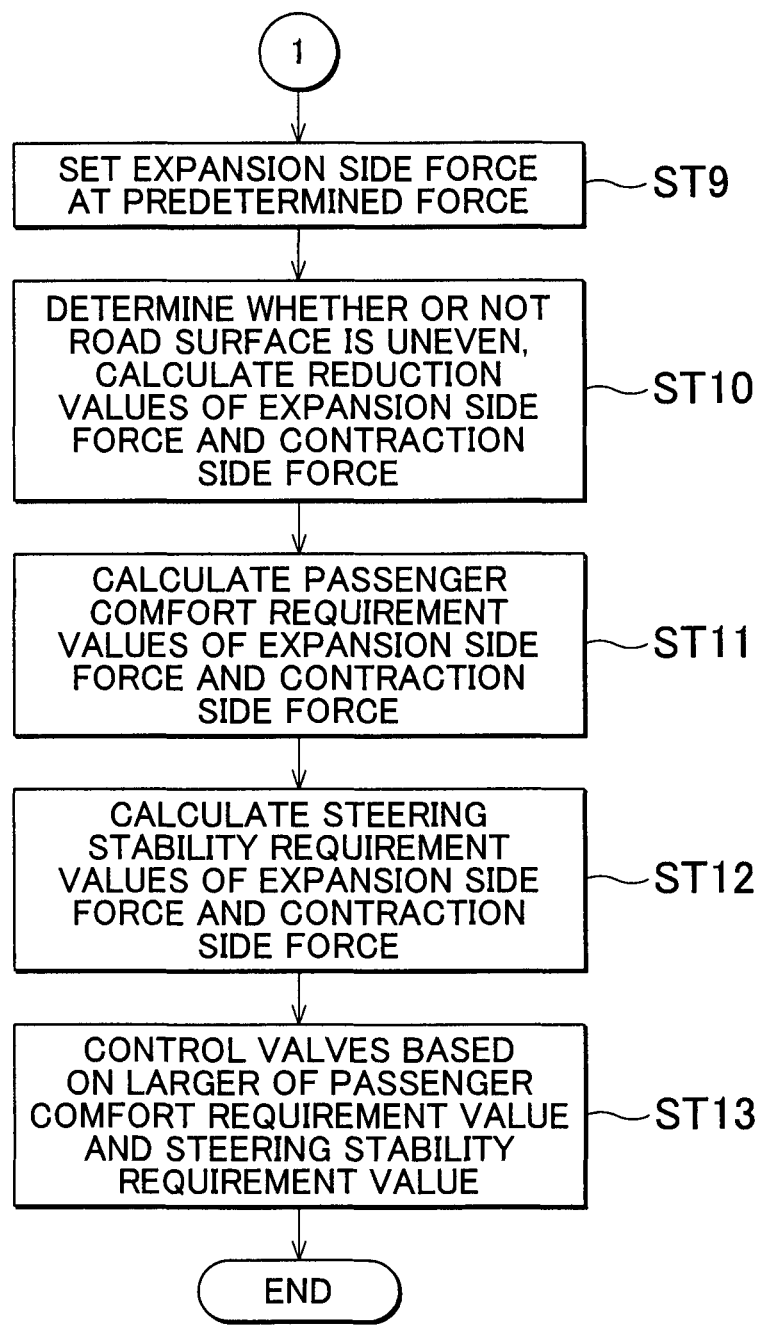
Figure 7:
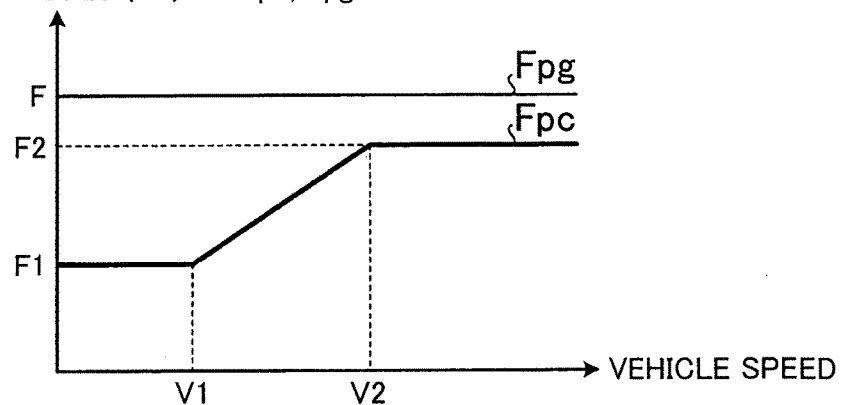
FIG. 7 is a view illustrating calculation of absolute values of forces by which the expansion side friction member and the contraction side friction member are pressed against a piston in the flowchart shown in FIG. 6.
Figure 8:
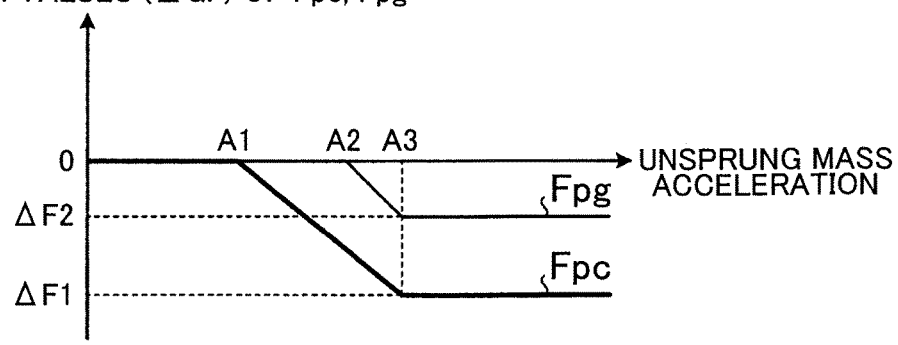
FIG. 8 is a view illustrating calculation of reduction values of the forces by which the expansion side friction member and the contraction, side friction member are pressed against the piston in the flowchart shown in FIG. 6.
Figure 9:
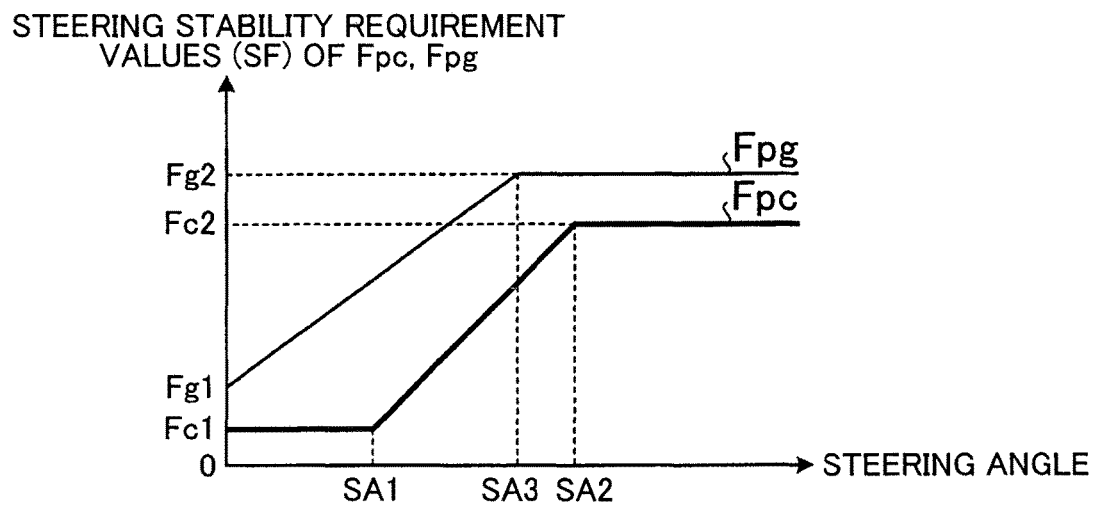
FIG. 9 is a view illustrating calculation of steering stability requirement values of the forces by which the expansion side friction member and the contraction side friction member are pressed against the piston in the flowchart shown in FIG. 6.

A suspension apparatus according to a second embodiment of the invention will now be described on the basis of FIGS. 5 to 9. FIG. 5 is a view showing a schematic configuration of the suspension apparatus according to the second embodiment. FIG. 6 is an example of a flowchart illustrating control of the pressure of the working oil supplied to the expansion side pressure sensing chamber and the contraction side pressure sensing chamber, which is executed by an ECU of the suspension apparatus according to the second embodiment. FIG. 7 is a view illustrating calculation of absolute values of the forces by which the expansion side friction member and the contraction side friction member are pressed against the piston in the flowchart shown in FIG. 6. FIG. 8 is a view illustrating calculation of reduction values of the forces by which the expansion side friction member and the contraction side friction member are pressed against the piston in the flowchart shown in FIG. 6. FIG. 9 is a view illustrating calculation of steering stability requirement values of the forces by which the expansion side friction member and the contraction side friction member are pressed against the piston in the flowchart shown in FIG. 6. Note that in FIGS. 5 to 9, identical parts to the first embodiment have been allocated identical reference numerals, and description thereof has been omitted.

In the second embodiment, as shown in FIG. 5, the suspension apparatus 1 includes an expansion side flow control valve 61 (an expansion side pressure adjustment unit), a contraction side flow control valve 62 (a contraction side pressure adjustment unit), and an ECU 63 serving as a control unit. The expansion side flow control valve 61 is provided in the expansion side passage 41. The expansion side flow control valve 61 is capable, in response to a command from the ECU 63, of adjusting an amount of the working oil in the piston upper chamber 39 to be supplied to the expansion side pressure sensing chamber 37, or in other words an amount of the working oil in the piston upper chamber 39 to be applied to the expansion side friction member 44. By adjusting the amount of the working oil in the piston upper chamber 39 to be applied to the expansion side friction member 44 in response to a command from the ECU 63, the expansion side flow control valve 61 can adjust the force Fpg by which the expansion side friction member 44 is pressed against the piston rod 30.

The contraction side flow control valve 62 is provided in the contraction side passage 42. The contraction side flow control valve 62 is capable, in response to a command from the ECU 63, of adjusting an amount of the working oil in the piston lower chamber 40 to be supplied to the contraction side pressure sensing chamber 38, or in other words an amount of the working oil in the piston lower chamber 40 to be applied to the contraction side friction member 45. By adjusting the amount of the working oil in the piston lower chamber 40 to be applied to the contraction side friction member 45 in response to a command from the ECU 63, the contraction side flow control valve 62 can adjust the force Fpc by which the contraction side friction member 45 is pressed against the piston rod 30.

The ECU 63 is provided singly in relation to the plurality of suspension apparatuses 1. When the vehicle includes four vehicle wheels, for example, a single ECU 63 is provided in relation to the four suspension apparatuses 1. The ECU 63 adjusts the forces Fpg, Fpc by which the respective friction members 44, 45 are pressed against the piston rod 30 by controlling the expansion side flow control valve 61 and the contraction side flow control valve 62 of each suspension apparatus 1. Here, the ECU 63 controls respective parts of the vehicle installed with the suspension apparatus 1. The ECU 63 is an electronic circuit having a conventional microcomputer including a central processing unit (CPU), a read-only memory (ROM), a random access memory (RAM), and an interface as a main body.

Further, various sensors, such as a vehicle speed sensor 71, a sprung mass acceleration sensor 72 serving as a sprung mass acceleration detection unit, an unsprung mass acceleration sensor 73 serving as an unsprung mass acceleration detection unit, and a steering angle sensor 74 serving as a steering angle detection unit, and the respective parts of the vehicle are electrically connected to the ECU 63. The vehicle speed sensor 71 detects a speed of the vehicle (to be referred to hereafter as a "vehicle speed"). The sprung mass acceleration sensor 72 is disposed on the sprung member. The sprung mass acceleration sensor 72 detects an acceleration (to be referred to hereafter as a "sprung mass acceleration") in the expansion/contraction direction of the suspension apparatus 1, typically a vertical direction of the sprung member. The unsprung mass acceleration sensor 73 is disposed on the unsprung member. The unsprung mass acceleration sensor 73 detects an acceleration (to be referred to hereafter as an "unsprung mass acceleration") in the expansion/contraction direction of the suspension apparatus 1, typically a vertical direction of the unsprung member. The steering angle sensor 74 detects a steering angle of the vehicle installed with the suspension apparatus 1, represented here by a steering wheel steering angle, or in other words a steering wheel operation amount. Electric signals (detection signals) corresponding to detection results from the various sensors are input into the ECU 63, whereupon the ECU 63 outputs drive signals to the respective parts of the vehicle installed with the suspension apparatus 1 in accordance with the input detection results in order to control driving thereof.

Next, an example of a routine performed by the ECU 63 to control the pressure of the working oil supplied to the expansion side pressure sensing chamber and the contraction side pressure sensing chamber will be described on the basis of the flowchart shown in FIG. 6. Note that a control routine shown on the flowchart in FIG. 6 is executed repeatedly at control period intervals of several ms to several tens of ms.

First, the ECU 63 calculates the vehicle speed on the basis of the detection result obtained by the vehicle speed sensor 71 (step ST1). Following step ST1, the ECU 63 calculates the steering angle and a steering angle velocity of the vehicle on the basis of the detection result obtained by the steering angle sensor 74 (step ST2). Following step ST2, the ECU 63 calculates the sprung mass acceleration and the unsprung mass acceleration on the basis of the detection results obtained by the sprung mass acceleration sensor 72 and the unsprung mass acceleration sensor 73 (step ST3).

The ECU then determines whether or not the vehicle speed calculated in step ST1 is equal to or lower than a first predetermined vehicle speed (V1) such as 70 km/h, for example (step ST4). When the vehicle speed is determined to be equal to or lower than the first predetermined vehicle speed (V1) (step ST4: Yes), the ECU 63 sets an absolute value (VF) of the force Fpc by which the contraction side friction member 45 is pressed against the piston rod 30 at a first predetermined force (F1), as shown in FIG. 7 (step ST5). When the vehicle speed is determined to exceed the first predetermined vehicle speed (V1) (step ST4: No), the ECU 63 determines whether or not the vehicle speed calculated in step ST1 equals or exceeds a second predetermined vehicle speed (V2) such as 100 km/h, for example (step ST6). When the vehicle speed calculated in step ST1 is determined to equal or exceed the second predetermined vehicle speed (V2) (step ST6: Yes), the ECU 63 sets the absolute value (VF) of the force Fpc by which the contraction side friction member 45 is pressed against the piston rod 30 at a second predetermined force (F2), which is larger than the first predetermined force (F1), as shown in FIG. 7 (step ST7).

Further, when the vehicle speed calculated in step ST1 is determined to be lower than the second predetermined vehicle speed (V2) (step ST6: No), the ECU 63 sets the absolute value (VF) of the force Fpc by which the contraction side friction member 45 is pressed against the piston rod 30 at a force between the first predetermined force (F1) and the second predetermined force (F2) that is commensurate with the vehicle speed, as shown in FIG. 7 (step ST8). Then, as shown in FIG. 7, the ECU 63 sets the absolute value (VF) of the force Fpg by which the expansion side friction member 44 is pressed against the piston rod 30 at a predetermined force (F) that is larger than the second predetermined force (F2) irrespective of the vehicle speed of the vehicle (step ST9). Note that in FIG. 7, the abscissa shows the vehicle speed and the ordinate shows the absolute values (VF) of the forces Fpc, Fpg. The ECU 63 calculates the absolute values (VF) of the forces Fpc, Fpg in accordance with the vehicle speed throughout the processing of step ST1 to step ST9.

The ECU 63 then determines, on the basis of the sprung mass acceleration and the unsprung mass acceleration calculated in step ST3, whether or not the road surface on which the vehicle is traveling is uneven, and calculates a reduction value (ΔGF) of the force Fpc by which the contraction side friction member 45 is pressed against the piston rod 30 and a reduction value (ΔGF) of the force Fpg by which the expansion side friction member 44 is pressed against the piston rod 30 in accordance with the determined unevenness of the road surface (step ST10). The ECU 63 then calculates a sum of the absolute value (VF) of the force Fpc calculated from step ST1 to step ST9 and the reduction value (ΔGF) of the force Fpc calculated in step ST10, and sets a resulting value as a passenger comfort requirement value (VF+ΔGF) of the force Fpc by which the contraction side friction member 45 is pressed against the piston rod 30 (step ST11). Further, the ECU 63 calculates a sum of the absolute value (VF) of the force Fpg calculated from step ST1 to step ST9 and the reduction value (ΔGF) of the force Fpg calculated in step ST10, and sets a resulting value as a passenger comfort requirement value (VF+ΔGF) of the force Fpg by which the expansion side friction member 44 is pressed against the piston rod 30 (step ST11). The passenger comfort requirement value is a value for minimizing the force Fpc by which the contraction side friction member 45 is pressed against the piston rod 30, thereby maximizing the ease with which the suspension apparatus 1 contracts, in order to prioritize passenger comfort.

In step ST10, the ECU 63 calculates the reduction value (ΔGF) of the force Fpc and the reduction value (ΔGF) of the force Fpg on the basis of FIG. 8. As shown in FIG. 8, when the unsprung mass acceleration is equal to or smaller than a first predetermined acceleration (A1), the ECU 63 sets the reduction value (ΔGF) of the force Fpc by which the contraction side friction member 45 is pressed against the piston rod 30 at zero. As shown in FIG. 8, when the unsprung mass acceleration is equal to or smaller than a second predetermined acceleration (A2) that is greater than the first predetermined acceleration (A1), the ECU 63 sets the reduction value (ΔGF) of the force Fpg by which the expansion side friction member 44 is pressed against the piston rod 30 at zero.

Further, as shown in FIG. 8, when the unsprung mass acceleration is equal to or larger than a third predetermined acceleration (A3) that is greater than the second predetermined acceleration (A2), the ECU 63 sets the reduction value (ΔGF) of the force Fpc by which the contraction side friction member 45 is pressed against the piston rod 30 at a first predetermined reduction, value (ΔF1), and sets the reduction value (ΔGF) of the force Fpg by which the expansion side friction member 44 is pressed against the piston rod 30 at a second predetermined reduction value (ΔF2). Note that an absolute value of the second predetermined reduction value (ΔF2) is smaller than an absolute value of the first predetermined reduction value (ΔF1).

Further, as shown in FIG. 8, when the unsprung mass acceleration is larger than the first predetermined acceleration (A1) but smaller than the third predetermined acceleration (A3), the ECU 63 sets the reduction value (ΔGF) of the force Fpc by which the contraction side friction member 45 is pressed against the piston rod 30 at a value between zero and the first predetermined reduction value (ΔF1) that is commensurate with the unsprung mass acceleration. As shown in FIG. 8, when the unsprung mass acceleration is larger than the second predetermined acceleration (A2) but smaller than the third predetermined acceleration (A3), the ECU 63 sets the reduction value (ΔGF) of the force Fpg by which the expansion side friction member 44 is pressed against the piston rod 30 at a value between zero and the second predetermined reduction value (ΔF2) that is commensurate with the unsprung mass acceleration. Note that in FIG. 8, the abscissa shows the unsprung mass acceleration and the ordinate shows the reduction values (ΔGF) of the forces Fpc, Fpg. According to the invention, the ECU 63 may calculate the reduction value (ΔGF) of the force Fpc and the reduction value (ΔGF) of the force Fpg in step ST10 on the basis of the sprung mass acceleration.

After setting the passenger comfort requirement values (VF+ΔGF) of the forces Fpc, Fpg, the ECU 63 calculates steering stability requirement values (SF) of the force Fpc and the force Fpg (step ST12). The steering stability requirement values (SF) of the forces Fpc, Fpg are calculated on the basis of FIG. 9.

As shown in FIG. 9, when the steering angle calculated in step ST2 is equal to or smaller than a first predetermined steering angle (SA1), the ECU 63 sets the steering stability requirement value (SF) of the force Fpc by which the contraction side friction member 45 is pressed against the piston rod 30 at a first contraction side steering stability requirement value (Fc1). As shown in FIG. 9, when the steering angle calculated in step ST2 is equal to or smaller than a second predetermined steering angle (SA2), the ECU 63 sets the steering stability requirement value (SF) of the force Fpc by which the contraction side friction member 45 is pressed against the piston rod 30 at a second contraction side steering stability requirement value (Fc2). As shown in FIG. 9, when the steering angle calculated in step ST2 is larger than the first predetermined steering angle (SA1) but smaller than the second predetermined steering angle (SA2), the ECU 63 sets the steering stability requirement value (SF) of the force Fpc by which the contraction side friction member 45 is pressed against the piston rod 30 at a value between the first contraction side steering stability requirement value (Fc1) and the second contraction side steering stability requirement value (Fc2) that is commensurate with the steering angle.

Further, as shown in FIG. 9, when the steering angle calculated in step ST2 is zero, the ECU 63 sets the steering stability requirement value (SF) of the force Fpg by which the expansion side friction member 44 is pressed against the piston rod 30 at a first expansion side steering stability requirement value (Fg1) that is larger than the first contraction side steering stability requirement value (Fc1). As shown in FIG. 9, when the steering angle calculated in step ST2 equals or exceeds a third predetermined steering angle (SA3), the ECU 63 sets the steering stability requirement value (SF) of the force Fpg by which the expansion side friction member 44 is pressed against the piston rod 30 at a second expansion side steering stability requirement value (Fg2) that is larger than the first expansion side steering stability requirement value (Fg1) and the second contraction side steering stability requirement value (Fc2). Note that the third predetermined steering angle (SA3) is larger than the first predetermined steering angle (SA1) and smaller than the second predetermined steering angle (SA2). As shown in FIG. 9, when the steering angle calculated in step ST2 is larger than zero but smaller than the third predetermined steering angle (SA3), the ECU 63 sets the steering stability requirement value (SF) of the force Fpg by which the expansion side friction member 44 is pressed against the piston rod 30 at a value between the first expansion side steering stability requirement value (Fg1) and the second expansion side steering stability requirement value (Fg2) that is commensurate with the steering angle. Note that in FIG. 9, the abscissa shows the steering angle and the ordinate shows the steering stability requirement values (SF) of the forces Fpc, Fpg. According to the invention, the ECU 63 may calculate the steering stability requirement value (SF) of the force Fpc and the steering stability requirement value (SF) of the force Fpg in step ST12 on the basis of the steering angle velocity. The steering stability requirement value (SF) is a value, for maximizing the force Fpg by which the expansion side friction member 44 is pressed against the piston rod 30, thereby minimizing the ease with which the suspension apparatus 1 expands, in order to prioritize suppression of rolling at the start of the steering operation.

After calculating the steering stability requirement values (SF) of the force Fpc and the force Fpg, the ECU 63 compares the passenger comfort requirement value (VF+ΔGF) of the force Fpc, calculated in step ST11, with the steering stability requirement value (SF) of the force Fpc, calculated in step ST12. The ECU 63 then controls the contraction side flow control valve 62 to make the force Fpc as fixed as possible, with the larger of the passenger comfort requirement value (VF+ΔGF) and the steering stability requirement value (SF) as an upper limit force thereof (ST13).

Further, the ECU 63 compares the passenger comfort requirement value (VF+ΔGF) of the force Fpg, calculated in step ST11, with the steering stability requirement value (SF) of the force Fpg, calculated in step ST12. The ECU 63 then controls the expansion side flow control valve 61 to make the force Fpg as fixed as possible, with the larger of the passenger comfort requirement value (VF+ΔGF) and the steering stability requirement value (SF) as an upper limit force thereof (ST13). The ECU 63 then terminates the current control period and advances to the next control period.

With the suspension apparatus 1 according to the second embodiment, in addition to the effects of the first embodiment, the amount of the working oil in the piston upper chamber 39 to be applied to the expansion side friction member 44 and the amount of the working oil in the piston lower chamber 40 to be applied to the contraction side friction member 45 can be adjusted. With the suspension apparatus 1, therefore, the forces Fpg, Fpc of the expansion side friction member 44 and the contraction side friction member 45, or in other words the force by which the expansion side friction member 44 and the contraction side friction member 45 damp the movement of the piston rod 30 of the piston 22, can be modified and adjusted appropriately. Hence, with a simple configuration including the flow control valves 61, 62 in addition to the friction members 44, 45, the friction members 44, 45 can be caused to generate forces Fpg, Fpc more suited to the travel condition of the vehicle. As a result, a further improvement in passenger comfort during vehicle travel can be achieved more reliably.

Furthermore, in the second embodiment, the passenger comfort requirement values (VF+ΔGF) and the steering stability requirement values (SF) of the forces Fpg, Fpc are calculated, and the flow control valves 61, 62 are controlled such that the larger force Fpg, Fpc thereof is generated by the friction members 44, 45. As a result, passenger comfort and a reduction in rolling at the start of the steering operation can be achieved simultaneously in the suspension apparatus 1.

Moreover, when the passenger comfort requirement value (VF+ΔGF) of the force Fpc is calculated in the second embodiment, the absolute value (VF) of the force Fpc by which the contraction side friction member 45 is pressed against the piston rod 30 is reduced on a low speed side, and therefore priority can be given to securing passenger comfort at a low speed.

Further, in the second embodiment, when the unsprung mass acceleration increases, or in other words when the unevenness of the road surface increases, during calculation of the passenger comfort requirement values (VF+ΔGF) of the forces Fpg, Fpc, absolute values of the reduction values (ΔGF) of the forces Fpg, Fpc are increased. Thus, in the suspension apparatus 1, the forces Fpg, Fpc are reduced when the road surface is uneven, and as a result, the unevenness of the road surface can be absorbed easily.

Furthermore, in the second embodiment, when the steering angle increases, or in other words when the vehicle attempts to turn, during calculation of the steering stability requirement values (SF) of the forces Fpg, Fpc, the steering stability requirement values (SF) of the forces Fpg, Fpc are increased, and therefore rolling of the vehicle body at the start of the steering operation can be suppressed reliably.

Note that in the first and second embodiments described above, the angle θg formed by the tapered outer peripheral surface 44b of the expansion side friction member 44 and the axial center P is smaller than the angle θc formed by the tapered outer peripheral surface 45b of the contraction side friction member 45 and the axial center P. According to the invention, however, the angle θg does not necessarily have to be smaller than the angle θc. In this case, the angles θg, θc are preferably determined in accordance with a difference between the pressures Pg, Pc within a scope that does not depart from the spirit of the invention.

The suspension apparatus 1 according to the embodiments of the invention described above is not limited to the above embodiments, and may be subjected to various modifications within the scope of the claims. In the above description, the ECU 63 also serves as an ECU that controls the entire vehicle, but the ECU 63 is not limited thereto. For example, the ECU 63 may be provided separately to the ECU that controls the entire vehicle. Further, the control routine is not limited to the flowchart shown in FIG. 6. Furthermore, the damping force application unit 24 is not limited to being provided in the shell 27, and may be provided in another appropriate location.

The invention claimed is:

1. A suspension apparatus comprising:
a cylinder, an interior space of the cylinder being partitioned into a piston upper chamber and a piston lower chamber;
a piston;
a piston portion provided with the piston, the piston portion configured to reciprocate through the cylinder and to partition the interior space of the cylinder into the piston upper chamber at an upper side of the piston portion and the piston lower chamber at a lower side of the piston portion;
the piston further includes a piston rod that extends upward from the piston portion;
an expansion side friction member configured to damp a movement of the piston toward the piston upper chamber, a force of the expansion side friction member for damping the movement of the piston toward the piston upper chamber being increased by exerting a pressure of the piston upper chamber on the expansion side friction member such that the expansion side friction member is pressed against the piston rod; and
a contraction side friction member configured to damp the movement of the piston toward the piston lower chamber, a force of the contraction side friction member for damping the movement of the piston toward the piston lower chamber being increased by exerting a pressure of the piston lower chamber on the contraction side friction member such that the contraction side friction member is pressed against the piston rod,
wherein the expansion side friction member and the contraction side friction member are disposed in the cylinder at an upper side of the piston upper chamber.

2. The suspension apparatus according to claim 1, wherein the force of the expansion side friction member for damping the movement of the piston, which is increased by exerting the pressure of the piston upper chamber on the expansion side friction member, is larger than the force of the contraction side friction member for damping the movement of the piston, which is increased by exerting the pressure of the piston lower chamber on the contraction side friction member.

3. The suspension apparatus according to claim 2, wherein:
the expansion side friction member has a tapered outer peripheral surface and the contraction side friction member has a tapered outer peripheral surface; and
an angle formed by the outer peripheral surface of the expansion side friction member and an axial center of the piston is smaller than an angle formed by the outer peripheral surface of the contraction side friction member and the axial center of the piston.

4. The suspension apparatus according to claim 1, wherein:
the cylinder is connected to one of a sprung member and an unsprung member; and
the piston is connected to the other of the sprung member and the unsprung member.

5. The suspension apparatus according to claim 1, wherein:
a working fluid that generates fluid resistance is sealed in the cylinder;
a pressure of the working fluid in the piston upper chamber is exerted on the expansion side friction member; and
a pressure of the working fluid supplied in the piston lower chamber is exerted on the contraction side friction member.

6. The suspension apparatus according to claim 5, further comprising:
an expansion side pressure sensing chamber;
a contraction side pressure sensing chamber;
an expansion side passage that connects the piston upper chamber and the expansion side pressure sensing chamber; and
a contraction side passage that connects the piston lower chamber and the contraction side pressure sensing chamber, wherein:
when the suspension apparatus expands, the working fluid in the piston upper chamber is supplied into the expansion side pressure sensing chamber through the expansion side passage, and a pressure of the working fluid supplied into the expansion side pressure sensing chamber is exerted on the expansion side friction member; and
when the suspension apparatus contracts, the working fluid in the piston lower chamber is supplied into the contraction side pressure sensing chamber through the contraction side passage, and a pressure of the working fluid supplied into the contraction side pressure sensing chamber is exerted on the contraction side friction member.

7. The suspension apparatus according to claim 5, further comprising:
an expansion side pressure adjustment unit configured to adjust an amount of the working fluid in the piston upper chamber to be applied to the expansion side friction member; and
a contraction side pressure adjustment unit configured to adjust an amount of working fluid in the piston lower chamber to be applied to the contraction side friction member.

8. The suspension apparatus according to claim 7, further comprising a control unit that controls the expansion side pressure adjustment unit and the contraction side pressure adjustment unit.

9. The suspension apparatus according to claim 1, further comprising:
a sealing member disposed at an upper opening of the cylinder; and
a closing member disposed at a lower opening on the cylinder,
the sealing member and the closing member configured to seal the interior space,
wherein the expansion side friction member and the contraction side friction member are disposed in the cylinder at an upper side of the sealing member.

* * * * *